United States Patent
Shooshtari et al.

(10) Patent No.: US 8,377,564 B2
(45) Date of Patent: *Feb. 19, 2013

(54) CELLULOSIC COMPOSITE

(75) Inventors: Kiarash Alavi Shooshtari, Littleton, CO (US); Philip Francis Miele, Highlands Ranch, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 502 days.

This patent is subject to a terminal disclaimer.

(21) Appl. No.: 12/543,574

(22) Filed: Aug. 19, 2009

(65) Prior Publication Data

US 2011/0045966 A1 Feb. 24, 2011

(51) Int. Cl.
 *B32B 23/04* (2006.01)
(52) U.S. Cl. ............ 428/533; 428/534; 428/537.5
(58) Field of Classification Search .......... 428/533, 428/534, 537.5
See application file for complete search history.

(56) References Cited

U.S. PATENT DOCUMENTS

| | | | |
|---|---|---|---|
| 1,801,053 A | | 4/1931 | Meigs |
| 6,822,042 B2 * | | 11/2004 | Capps ................. 524/590 |
| 6,841,231 B1 * | | 1/2005 | Liang et al. ............. 428/296.7 |
| 7,217,458 B2 * | | 5/2007 | Liu et al. ............... 428/423.1 |
| 7,655,711 B2 | | 2/2010 | Swift et al. |
| 2007/0027283 A1 | | 2/2007 | Swift et al. |
| 2007/0123679 A1 | | 5/2007 | Swift et al. |
| 2007/0123680 A1 | | 5/2007 | Swift et al. |

FOREIGN PATENT DOCUMENTS

| | | |
|---|---|---|
| DE | 19 05 054 A1 | 8/1969 |
| DE | 43 08 089 A1 | 9/1994 |
| WO | 2007/014236 A2 | 2/2007 |

* cited by examiner

*Primary Examiner* — Leszek Kiliman
(74) *Attorney, Agent, or Firm* — Robert D. Touslee

(57) ABSTRACT

Provided is a cellulosic composite comprised of cellulosic material and a binder. The binder comprises a reaction product of an amine and a reactant in the form of an amino-amide intermediate. To the amino-amide is added an aldehyde or ketone to form a curable binder composition. The composition when mixed with cellulosic material and cured forms a cellulosic composite.

14 Claims, No Drawings

CELLULOSIC COMPOSITE

BACKGROUND

The subject invention pertains to a cellulosic composite which uses an improved binding composition. More specifically, the invention pertains to a cellulosic composite which employs as a binder an improved curable composition comprising an addition product of an amine and a reactant in the form of a amino-amide intermediate. An aldehyde or ketone is added to the amino-amide to form a composition which upon curing is capable of forming a water-insoluble polymer composition.

Composite wood products prepared from various lignocellulosic materials (e.g., wood) have been known for centuries, although industrial production began only about a century ago. Among other things, these products offer a relatively low cost and a reasonably high strength to weight ratio. Consequently, they are used in a number of capacities including interior and exterior construction, furniture and even marine applications. Several distinct composite wood products exist including plywood, oriented strand board, particleboard and medium density fiberboard (MDF).

One type of molded composite article is a cellulosic (or woody) composite which includes man-made boards of bonded wood sheets and/or lignocellulosic materials, commonly referred to in the art by the following exemplary terms: fiberboards such as hardboard, medium density fiberboard, and softboard; particleboards such as chipboard, flakeboard, particleboard, strandboard, and waferboard. Wood composites also include man-made boards comprising combinations of these materials. These wood composites can be used as columns, floors, ceilings, walls, doors, siding and stairs in the construction of homes, offices, and other types of buildings, as well as furniture components, such as chairs, tables, countertops, cabinets, and cabinet doors, for example.

Many different methods of manufacturing wood composites are known in the art such as, for example, those described in U.S. Pat. No. 6,841,231. The principal processes for the manufacture of fiberboard include: (a) wet felted/wet pressed or "wet" processes; (b) dry felted/dry pressed or "dry" processes; and, (c) wet felted/dry pressed or "wet-dry" processes. Synthetic binder resins, such as amino resins, urea-formaldehyde resins, phenol-formaldehyde resins, or modified phenol-formaldehyde resins, are often used as binders in these processes. Other binders include, but are not limited to, starches, asphalt, and gums.

Products such as particleboard and MDF are typically prepared from an adhesive resin composition and comminuted lignocellulosic materials such as wood flakes or wood fibers. The manufacture of particleboard and MDF begins with the reduction of the wood particles to a particulate size or a fiber, which will occasionally be referred to herein as a furnish. This furnish is then blended with an adhesive resin and transported to a forming device, which shapes the mixture into a mat. The mat is then loaded into a heated press that shapes and pressurizes the mat to a desired thickness. The pressure and heat together act to cure the resin, which bonds the mixture into a panel or board. Bonding performance is affected by, among other factors, the amount and type of resin, the curing time and the curing pressure.

In U.S. Pat. No. 7,217,458, OSB boards are discussed. Oriented strand board ("OSB") is commercially available. OSB material generally is formed of multiple layers of wood "flakes" or "strands" bonded together by a resin binder under heat and compression to provide a unitary board structure. The flakes are made by cutting logs into thin slices with a knife edge oriented parallel to the length of a debarked log. The cut flakes are broken into narrow strands generally having lengths oriented parallel to the wood grain that are larger than the strand widths.

In one common fabrication of oriented strand board, the flakes generally are first dried to remove water, and are then coated in a blender with a thin layer of binder and sizing agent. The coated flakes are then spread on a conveyor belt to provide a surface ply or layer having flakes oriented generally in line with the conveyor belt, then one or more plies that will form an interior ply or plies of the finished board is (are) deposited on the surface ply such that the one or more plies is (are) oriented generally perpendicular to the conveyor belt. Then, another surface ply having flakes oriented generally in line with the conveyor belt is deposited over the intervening one or more plies having flakes oriented generally perpendicular to the conveyor belt. The resulting structure includes plies having flakes oriented generally perpendicular to a neighboring ply insofar, such as for each surface ply and the adjoining interior ply. The layers of oriented "strands" or "flakes" are finally exposed to heat and pressure to bond the strands and binder together to form a consolidated board structure. Other variations on this basic manufacturing scheme also are known. The resulting product is then cut to size and shipped. Typically, the resin and sizing agent comprise less than 10% by weight of the oriented strand board.

The predominant resin systems in the composite wood industry are urea-formaldehyde (UF) and phenol-formaldehyde (PF) resins. Although these formaldehyde-based resins perform consistently, the physical properties of composite wood products prepared with formaldehyde-based resins are often unsatisfactory. For example, the internal bond strength of composite wood products frequently renders them unfit for certain demanding applications. In addition, such products are commonly susceptible to significant swelling upon exposure to moisture. As a consequence of these and other factors, composite wood products prepared with UF and PF resins are often less robust than desired.

Currently, alternatives to formaldehyde-based resins are being investigated. See, for example U.S. Pat. No. 6,822,042. The potentially attractive alternatives include resin systems that employ isocyanates. Such resin systems have been shown to impart markedly improved physical properties to composite wood products. For example, concentrated isocyanate-based resins increase bonding strength, and therefore offer a more robust and durable composite wood product. Unfortunately, isocyanate-based resins also have several known drawbacks that have limited their commercial utility. First, isocyanates are relatively expensive as compared to other resin materials. Consequently, concentrated isocyanate-based resins are uneconomical as compared with traditional formaldehyde-based resins. Second, unlike UF and PF resins, isocyanates are highly reactive with water. Consequently, isocyanates react quickly with any water present in either the wood furnish or the resin itself. This limits both the shelf-life of the resin and the lignocellulosic materials with which it can be used. Third, isocyanates are toxic and their use creates environmental, health and industrial hygiene concerns. Thus, process safety considerations influence against the use of concentrated isocyanate-based resins.

Accordingly, in one aspect the present invention provides a novel cellulosic composite comprised of a unique formaldehyde free binder.

Another aspect of the invention provides a novel cellulosic composite with a binder which provides the possibility of lower binder usage, the possibility of overall lower energy consumption, increased sustainability of the raw materials utilized in the formation of the binder, considerable reduction in the use of petroleum based ingredients and improved overall economics.

Still another aspect of the present invention is to provide a cellulosic composite which employs a unique binder having improved economics, improved health, safety and environment factors by eliminating formaldehyde and isocyanate while also enjoying improved physical properties.

These and other aspects of the present invention will become apparent to the skilled artisan upon a review of the following description and the claims appended hereto.

SUMMARY OF THE INVENTION

Provided is a cellulosic composite comprised of cellulosic material and a binder. The binder is a curable composition comprising the reaction product of an amine and a reactant in the form of an amino-amide intermediate. To this intermediate is added an aldehyde or ketone, preferably a reducing sugar, to form the curable binder composition. This composition upon curing is capable of forming a water-insoluble polymer.

A process for preparing the cellulosic composite is also provided comprising mixing in with the cellulosic material a composition comprising an addition product of an amine and a reactant in the form of an amino-amide intermediate and an aldehyde or ketone. Thereafter the composition is cured while present in mixture with the cellulose material to form a water-insoluble polymer.

In one embodiment, the amino-amide intermediate is first heated to create an oligomer. The aldehyde or ketone is added to the oligomer. This composition is added to the cellulosic material as a binder and cured to provide the finished composite.

DETAILED DESCRIPTION OF PREFERRED EMBODIMENTS

The cellulosic composite is comprised of cellulosic material and a binder. The cellulosic material can be derived from any cellulosic source synthetic or natural such as wood or plants. It is preferred that a wood cellulosic material is used to prepare a particle board or an oriented strand board.

Cellulosic fibers such as, for example, wood fibers are prepared by the fiberization of woody chip material in a pressurized refiner, an atmospheric refiner, a mechanical refiner, and/or a thermochemical refiner. Generally, in a wet process, the cellulosic fibers are blended in a vessel with large amounts of water to form a slurry. The slurry preferably has sufficient water content to suspend a majority of the wood fibers and preferably has a water content of at least 95 percent by weight (wt. %). The water is used to distribute the synthetic resin binder over the wood fibers. This mixture is deposited onto a water-previous support member, such as a fine screen or a Fourdrinier wire, and pre-compressed, whereby much of the water is removed to leave a wet mat of cellulosic material having, for example, a moisture content of at least about 50 wt. % based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic material (e.g., wood fibers) in a vessel with a large amount of water. This slurry is then blended with a resin binder. The blend is then deposited onto a water-previous support member, where a large percentage (e.g., 50 wt. % or more) of the water is removed, thereby leaving a wet mat of cellulosic material having a water content of about 40 wt. % to about 60 wt. %, for example. This wet mat is then transferred to a zone where much of the remaining water is removed by evaporation by heat to form a dried mat. The dried mat preferably has a moisture content of about 10 wt. % or less. The dried mat can be finished at this point or transferred to a press and consolidated under heat and pressure to form a higher density wood composite which may be a flat board or a molded product, for example. The product can be molded into various shapes or geometries depending on the intended use.

In a dry forming process, cellulosic fibers are generally conveyed in a gaseous stream or by mechanical means. For example, the fibers supplied from a fiberizing apparatus (e.g., a pressurized refiner) may be coated with the binder composition in a blowline blending procedure, wherein the resin is blended with the fiber with the aid of air turbulence. Thereafter, the resin-coated fibers from the blowline can be randomly formed into a mat by air blowing the fibers onto a support member. Optionally, the fibers, either before or after formation of the mat, can be subjected to pre-press drying, for example in a tube-like dryer. The formed mat, typically having a moisture content of less than about 10 wt. %, and preferably about 5 wt. % to about 10 wt. %, then is pressed under heat and pressure to cure the thermosetting resin and to compress the mat into an integral consolidated structure.

As an alternative to conventional pressing, steam injection pressing is a consolidation step that can be used, for example, under certain circumstances in the dry and wet-dry process production of consolidated cellulosic composites. In steam injection pressing, steam is injected through perforated heating press platens, into, through, and then out of a mat that includes the synthetic resin and the filler material. The steam condenses on surfaces of the filler and heats the mat. The heat transferred by the steam to the mat as well as the heat transferred from the press platens to the mat cause the resin to cure.

The binder of the present invention, which is employed in making the cellulosic composite, is a curable composition comprising the reaction product of an amine and a reactant to form an amino-amide intermediate, together with a carbonyl compound such as an aldehyde or ketone.

In accordance with one embodiment of the invention, amine reactants are selected which are capable of undergoing conjugate addition to form the requisite amino-amide, which forms a water-insoluble polymer upon curing. In such an embodiment the amine is a di- or multi-functional primary or secondary amine. More preferably the amine is a diamine having at least one primary amine group.

Example of amines include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, ethers and others. Representative amines that are suitable for use in such an embodiment include 1,2-diethylamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, and mixtures of these. A preferred diamines for use in this embodiment of the invention are 1,4-butanediamine and 1,6-hexanediamine. Natural and synthetic amino acids such as lysine, arginine, histidine, etc can also be used.

The curable amino-amide is formed through the selection of a saturated or unsaturated reactant that is an anhydride, carboxylic acid, ester, salt or mixture of such reactants. Representative unsaturated reactants are maleic acid, fumaric acid, maleic anhydride, mono- and di-esters of maleic acid and fumaric acid, and salts and mixtures of these. Ammonium salts of the unsaturated acids of their monoesters conveniently can be utilized. A preferred unsaturated reactant is maleic anhydride. Representative saturated reactants include, but are not limited to, succinic anhydride, succinic acid, mono and diesters of succinic acid, glutaric acid and anhydride, phthalic acid and anhydride, tetrahydro phthalic acid and anhydride, mono and diesters of acid anhydrides and salts of the acids and their mono esters. Examples of preferred saturated reactants are phthalic anhydride and tetrahydro phthalic anhydride.

The amino-amide addition products can be readily formed by mixing the components in an aqueous medium at room temperature. The resulting addition products are either water-soluble, water-dispersible, or are present as an emulsion.

To the solution of amino-amide, the carbonyl functional materials can be added, especially an aldehyde or ketone. Due to their higher reactivity, aldehydes are preferred to ketones. The composition comprises the amino-amide and the aldehyde and/or ketone. Some reaction does occur within the composition between the components. However, the reaction is completed during the curing step, followed by the cross-linking reaction of curing.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, poly acrolein, copolymers of acrolein and others. Reducing mono, di- and polysaccharides such as glucose, maltose, celobiose etc. can be used, with reducing monosaccharides such as glucose being preferred.

Examples of ketones include but are not limited to acetone, acetyl acetone, 1,3 dihydroxy acetone, benzil, bonzoin, fructose, etc.

The aldehydes and ketones react with the amino-amide intermediate, which contains an amic acid function, i.e., an amide linkage in the vicinity of a carboxylic acid. An amic acid function is more reactive than a simple carboxylic acid. The amount of aldehyde and/or ketone added is generally such that the molar ratio of carboxylic acid in the amino-amide to carbonyl or ketone is from 1:50 to 50:1. A ratio of 1:20 to 20:1 is more preferred, with a ratio of 1:10 to 10:1 being most preferred.

One advantage is that the presence of all functional groups, i.e., amine, amide and carboxylic acid, on the same molecule eliminates the potential need for the addition of external crosslinkers or binders such as polycarboxylic acids and/or polyvinyl alcohol. Such crosslinkers can be added, however if desired.

In an embodiment, the amino-amide can be first oligomerized prior to adding the aldehyde or ketone. The amino-amide can be heated until an oligomer is obtained, e.g., a dimer, trimer or tetramer of the amino-amide intermediate. An example of suitable conditions for making the oligomer involves heating in the range of from 120-150° C. for up to 5 hours.

Using the oligomerized product has been found to result in a more robust binder product upon curing. This manifests itself in the strength of the binder, and allows for better storage results of products made with the binder.

The composition when mixed in with the cellulosic material can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

Thereafter the composition undergoes curing wherein a polyimeric binder is formed. The polymeric composition obtained upon curing is a combination of a polyamino-amide and a polyamino-imide. The polyimide is the primary product, but some of the amide in the intermediate is believed to not form the imide. Thus, some polyamino-amide is also present in the cured composition/binder.

Such curing can be conducted by heating. Elevated curing temperatures on the order of 100 to 300° C. generally are acceptable. Satisfactory curing results are achieved by heating in an air oven at 200° C. for approximately 20 minutes. The curing can occur during the formation of the composite, for example, when the water is being removed from the composite.

The present invention provides a formaldehyde-free route to form a securely bound formaldehyde-free composite product. The binder composition of the present invention also provides improved overall economics. The binder has the advantages of being stronger and offering lower amounts of relative organic content during curing, which ensures a safer work place and environment. The cure time of the binder is also seen to be much faster and therefore does favor the economics and lowers the carbon footprint. The binder also contains high level of sustainable raw materials further reducing the dependency to fossil based sources for the resin.

The following examples are presented to provide specific illustrations of the present invention. In each instance the thin glass plate substrate that receives the coating can be replaced by a cellulosic mixture. By mixing the binder in the examples in with cellulosic material, either fibrous, wood chips or a combination, an improved cellulosic composite can be obtained. It should be understood, however, that the invention is not limited to the specific details set forth in the Examples.

Formation of Amino-Amide Intermediates:

To 1160 g 1,6 hexane diamine (HMDA) dissolved in 2140 g water, 980 g maleic anhydride (MAn) was added slowly (molar ratio of 1:1) and the solution was stirred for 10 min. The intermediate was labeled HM.

To 1160 g HMDA dissolved in 2640 g water was added 1480 g phthalic anhydride. After the anhydride dissolved, the intermediate was labeled HPh.

To 1160 g HMDA dissolved in 2680 g water was added 1520 g tetrahydro phthalic anhydride. The solution was stirred until all anhydride dissolved. The intermediate was tabled HT.

These intermediates were utilized to make the following resins with glucose:

Example 1

To 42.8 g of solution of HM intermediate, anhydrous dextrose (alpha-D-glucose) and water was added. The mass of added water was chosen to be equal to that of corresponding dextrose. The mass of dextrose (and corresponding water) used was 18 g, 36 g. 54 g, 72 g, 90 g, 108, 144, 180 g and 216 g. The various solutions were stirred at ambient temperature for 10 min. The solutions were applied as thin film on glass and Al panel, dried in an oven at 100° C. for 5 min and cured at 200° C. for 20 min. Each film gave a cured brown polymer that was hard and insoluble in water and solvents.

Example 2

To 52.8 g of solution of HPh intermediate, anhydrous dextrose and water was added. The mass of added water was chosen to be equal to that of the corresponding dextrose. The mass of dextrose (and corresponding water) used was 18 g, 36 g. 54 g, 72 g, 90 g, 108, 144, 180 g and 216 g. The various solutions were stirred at ambient temperature for 10 min. The solutions were applied as a thin film on glass and A1 panel, dried in an oven at 100° C. for 5 min and cured at 200° C. for 20 min. Each file gave a cured brown polymer that was hard and insoluble in water and solvents.

Example 3

To 53.6 g of solution of HT intermediate, anhydrous dextrose and water was added. The mass of added water was chosen to be equal to that of the corresponding dextrose. The mass of dextrose (and corresponding water) used was 18 g, 36 g. 54 g, 72 g, 90 g, 108, 144, 180 g and 216 g. The various solutions were stirred at ambient temperature for 10 min. The solutions were applied as a thin film on glass and A1 panel, dried in an oven at 100° C. for 5 min and cured at 200° C. for 20 min. Each film gave a cured brown polymer that was hard and insoluble in water and solvents.

Example 4

Examples 1-3 were repeated in the presence of 5% by weight ammonium sulfate. The polymers became insoluble in water in less than 10 min.

Example 5

To 116 g. HMDA dissolved in 214 g water was added slowly 98 g maleic anhydride (MAn), this was a molar ratio of 1:1. The resulting solution was refluxed for 60 minutes to prepare an amino-amide oligomer. The solution was opaque with 50% solids. The solution was then used to repeat example 2 with the observed results being the same, i.e., the cured polymer was hard and insoluble in water solvents.

Example 6

Examples 6 was repeated in the presence of 5% by weight ammonium sulfate. The polymers became insoluble in water in less than 10 min.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

That which is claimed is:

1. A cellulosic composite comprising cellulosic material and a binder comprised of an aldehyde or ketone and an amino-amide which is a reaction product of an amine and a reactant selected from the group consisting of saturated and unsaturated anhydrides, carboxylic acids, esters, and salts and mixtures of these.

2. The cellulosic composite of claim 1, wherein the amine is a diamine having at least one primary amine group.

3. The cellulosic composite of claim 2 wherein said amine is selected from the group consisting of 1,2-diethylamine, 1,3-propanediamine, 1,4-butanediamine 1,5-pentanediamine, 1,6-hexanediamine, .alpha.,.alpha.'-diaminoxylene, diethylenetriamine, triethylenetetramine, tetraethylenepentamine, and mixtures thereof.

4. The cellulosic composite of claim 2, wherein said unsaturated reactant is selected from the group consisting of maleic acid, fumaric acid, maleic anhydride, itaconic acid, itaconic anhydride mono- and di-esters of maleic acid, mono- and di-esters of fumaric acid, and salts and mixtures thereof.

5. The cellulosic composite of claim 2, wherein said reactant is maleic anhydride.

6. The cellulosic composite of claim 1, wherein an aldehyde is used with the amino-amide.

7. The cellulosic composite of claim 6, wherein the aldehyde is a reducing sugar.

8. The cellulosic composite of claim 6, wherein the aldehyde is a reducing monosaccharide.

9. The cellulosic composite of claim 8, wherein the aldehyde is glucose.

10. The cellulosic composite of claim 1, further comprising at least one component selected from the group consisting, of adhesion promoters, oxygen scavengers, moisture repellants, solvents, emulsifiers, pigments, fillers, anti-migration aids, coalescent aids, wetting agents, biocides, plasticizers, organosilanes, anti-foaming agents, colorants, waxes, suspending agents, anti-oxidants, and crosslinking catalysts.

11. The cellulosic composite of claim 1, wherein the amino-amide is an oligomer.

12. The cellulosic composite of claim 1, wherein the composite is an OSB product.

13. The cellulosic composite of claim 1, wherein the composite is particle board.

14. A process preparing a cellulosic composite which comprises mixing cellulosic material with a binder comprised of an aldehyde or ketone and an amino-amide which is a reaction product of an amine and a reactant selected from the group consisting of saturated and unsaturated anhydrides, carboxylic acids, esters, salts and mixtures of these, and then curing the hinder when present in mixture with the cellulosic material.

* * * * *

UNITED STATES PATENT AND TRADEMARK OFFICE
CERTIFICATE OF CORRECTION

PATENT NO. : 8,377,564 B2
APPLICATION NO. : 12/543574
DATED : February 19, 2013
INVENTOR(S) : Kiarash Alavi Shooshtari et al.

Page 1 of 1

It is certified that error appears in the above-identified patent and that said Letters Patent is hereby corrected as shown below:

Column 8, line 50, "hinder" should read --binder--.

Signed and Sealed this
Second Day of April, 2013

Teresa Stanek Rea
*Acting Director of the United States Patent and Trademark Office*